June 28, 1927.
C. J. GORDON ET AL
1,633,581
SAFETY FAUCET
Filed Jan. 21, 1926
2 Sheets-Sheet 2
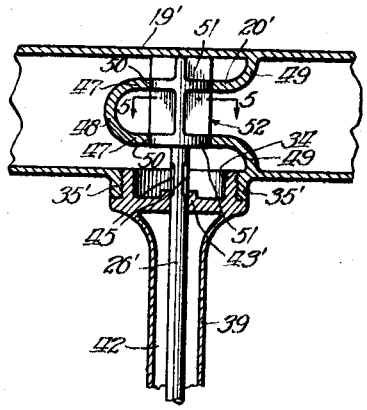
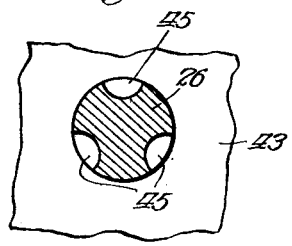
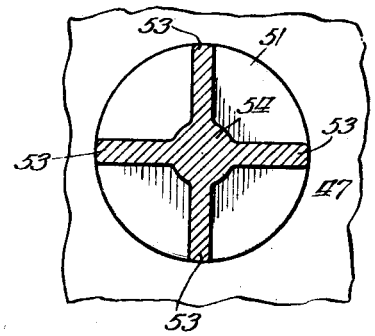
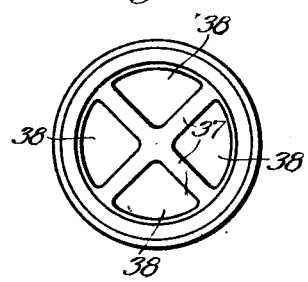
Inventors
Cyril J. Gordon and
David D. Goldberg
by Max W. Zabel Atty.

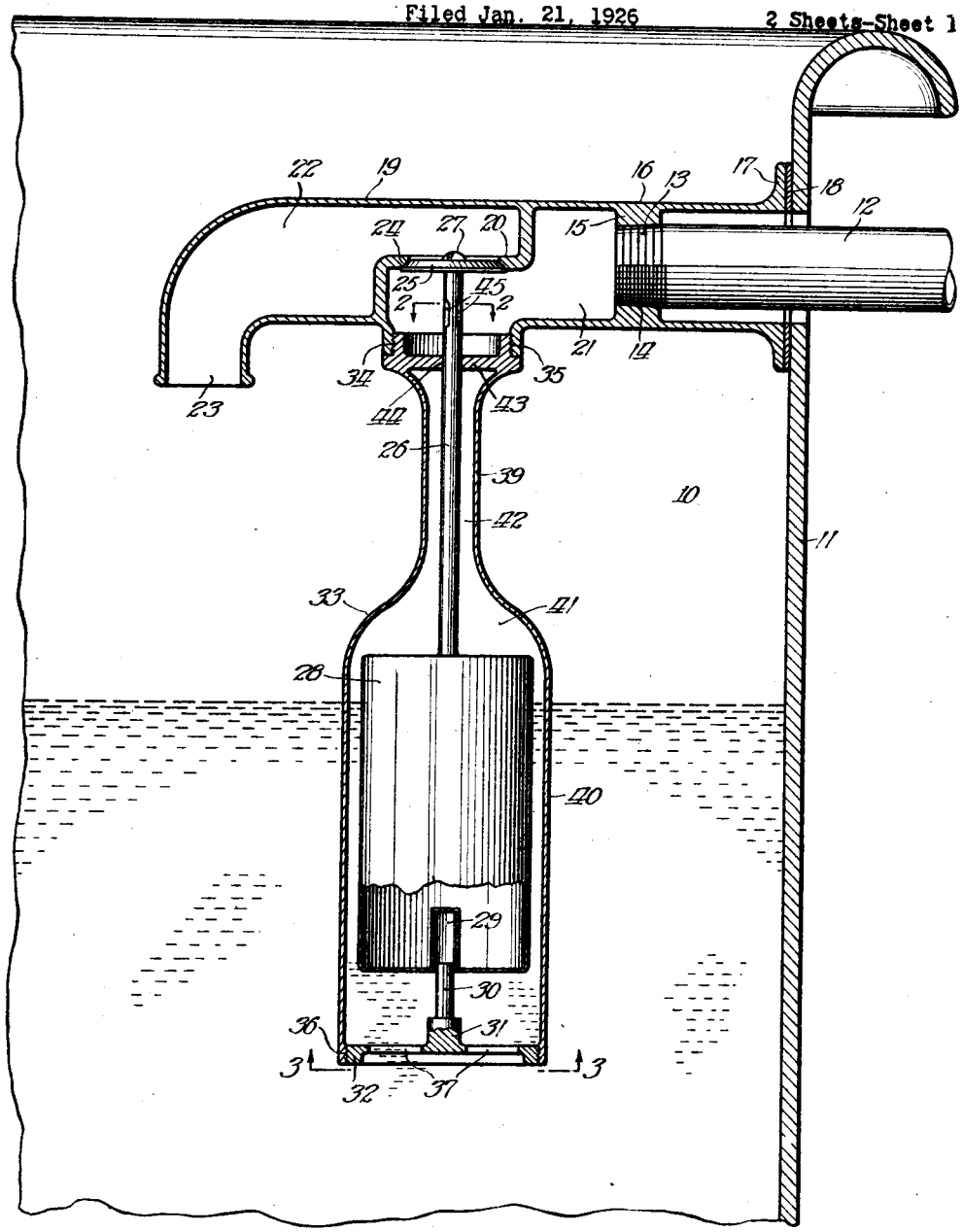

Patented June 28, 1927.

1,633,581

UNITED STATES PATENT OFFICE.

CYRIL JOSEPH GORDON AND DAVID D. GOLDBERG, OF CHICAGO, ILLINOIS.

SAFETY FAUCET.

Application filed January 21, 1926. Serial No. 82,745.

Our invention relates to faucets and more particularly to a faucet that is provided with a float controlled valve for controlling the flow of liquid from the same.

It is a purpose of our invention to provide a faucet such as used in connection with such liquid receptacles as bathtubs with means for preventing the overflow of the receptacle and preventing waste of water, said means comprising a float controlled valve.

It is a further purpose of the invention to provide a device of the above mentioned character having a liquid supply tube and a valve controlling the discharge of liquid from said tube, said valve being operated by means of a float that is mounted in a float chamber having an opening therein and carried by the tube.

More specifically it is a purpose of our invention to provide a valve in a device of the above mentioned character that has a stem extending rigidly therefrom carrying a float and a housing carried by the liquid supply tube comprising a float chamber which is open at the bottom thereof for admitting liquid therethrough, keeping the liquid in the float chamber substantially at the level of the liquid in the receptacle. Preferably, the bottom of the float chamber is provided with openings and with a guide member projecting upwardly therefrom into engagement with the float.

It is another purpose of the invention to provide means whereby a certain amount of the liquid is permitted to flow from the tube into the chamber through a passage communicating with both the tube and the chamber when the stem reaches a certain position to thus flush out the chamber and prevent the accumulation of scum and sediment therein which would interfere with the satisfactory operation thereof if this were permitted to accumulate.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in the art and as would fall within the scope of the claims.

In the drawings:

Fig. 1 is a vertical sectional view of our improved faucet in position in a bathtub, a fragment of the bathtub being shown;

Fig. 2 is an enlarged section taken on the line 2—2 of Fig. 1;

Fig. 3 is an end view taken substantially on the line 3—3 of Fig. 1;

Fig. 4 is a reduced fragmentary sectional view of a modified form of valve; and

Fig. 5 is an enlarged fragmentary section taken on the line 5—5 of Fig. 4.

Referring in detail to the drawings, in Figs. 1 to 3, inclusive, is shown one form of our invention which is shown as being applied to a bathtub 10 having a vertical wall portion 11 through which the pipe 12 extends, said pipe being threaded as at 13 to engage with the internal screwthreads 14 in the web 15 provided on the faucet 16, said faucet being provided with a flanged end portion 17 which is adapted to engage with the wall portion 11, a gasket 18 being inserted between said wall portion 11 and the flange 17, if desired.

The faucet includes a liquid supply tube 19 which is provided with a partition 20 dividing the same into a chamber 21 on one side thereof and a chamber 22 that is provided with a discharge opening 23 leading into the tub 10.

The partition 20 is provided with a valve seat 24 with which the valve member 25 engages, said valve member 25 being mounted on a stem 26 and being secured thereto by means of a screw 27. Depending from and mounted on the end of the stem 26 is a float 28 which is made in the form of an air tight hollow member which is provided with a recess 29 in the bottom wall thereof. Projecting into said recess 29 is a guide member 30 which extends upwardly from a boss 31 provided on the bottom member 32 of the housing 33. The housing 33 is provided with a screwthreaded end portion 34 that is adapted to engage with the internally screw-threaded flange portion 35 on the member 19. The member 32 screwthreadedly engages with the lower end portion of the member 33 at 36 and is provided with a plurality of webs 37 defining openings 38 in said bottom member 32.

The member 33 is provided with a portion of reduced diameter 39 and of enlarged diameter 40, the portion of enlarged diameter 40 defining a float chamber 41 and the portion 39 being provided with a passage 42 leading into said float chamber 41. A web 43 is provided at the upper end of the portion 39 that has an opening 44 therein slidably receiving the stem 26. The stem 26 is provided with a plurality of grooves or cut away portions 45, as will be clear from Fig. 2.

In operation, as the tub 10 fills, the float will rise due to the rise in level of the liquid 46 in said tub, finally reaching the position such that the valve 25 seats against the valve seat 24 shutting off the flow of liquid through the opening 23 into the tub. It is thus impossible to overflow the tub 10 even though the ordinary valves provided for controlling the supply of water thereto are not shut off due to negligence on the part of the operator. When the float is in down position, the valve 25 will lie adjacent the partition or web 43, permitting the unrestricted flow of liquid, such as water, through the faucet. As the valve member rises, the cut away portions 45 will allow a certain amount of the water passing through the chamber 21 to pass into the passage 42 and into the chamber 41, thus flushing out the chamber and the passage 42 and preventing the accumulation of material therein that might otherwise interfere with the proper operation of the float.

In the form of the invention shown in Fig. 1, the supply valves must be shut off before the valve 25 will unseat, because the pressure of the water against the conical valve 25 will hold the same against the conical seat 24. When the water is shut off, however, due to seepage between the stem 26 and the web 43, the pressure will finally be relieved to such an extent that the float 28 will drop after the water has been allowed to discharge from the tub 10.

In order to make the float valve independent of the operation of the supply valves, the arrangement shown in Figs. 4 and 5 may be used. Also, with this arrangement a larger opening is provided in the tubular portion of the faucet for the passage of the liquid therethrough. In this form of the invention the tubular portion 19' is provided with a partition 20' which is provided with a pair of substantially parallel wall portions 47 connected by means of a curved wall portion 48 and joining with the outer wall portion of the member 19 by means of the curved wall portions 49. The wall portions 47 are provided with openings 50 with which the disk-like flanges 51 on the valve member 52 are adapted to align to close said openings. The valve member 52 is provided with a plurality of guide webs 53, as will be evident from Fig. 5, radiating from a central body portion 54 and is mounted on the stem 26' corresponding to the stem 26 shown in Figs. 1 to 3, inclusive, and being provided with the openings 45 adapted to align with the web portion 43' in the same manner and for the same purpose as in Figs. 1 to 3, inclusive, the reduced end 39 of the housing in Fig. 4 being secured to the flange 35' on the member 19' in the same manner as is the member 33 to the flange 35 in Figs. 1 to 3.

Having thus described our invention, what we desire to claim and secure by United States Letters Patent is:

1. In a faucet, a liquid supply tube, a valve controlling the discharge of liquid from said tube, a stem depending rigidly therefrom, a float carried by said stem and a housing depending from said tube, said housing comprising a float chamber having openings therein.

2. In a faucet, a liquid supply tube, a valve controlling the discharge of liquid from said tube, a stem depending rigidly therefrom, a float carried by said stem and a housing depending from said tube, said housing comprising a float chamber open at the bottom thereof.

3. In a faucet, a liquid supply tube, a valve controlling the discharge of liquid from said tube, a stem depending therefrom, a float carried by said stem and a housing depending from said tube, said housing comprising a float chamber having openings in the bottom thereof, and a guide member for said float projecting upwardly from said bottom.

4. In a faucet, a liquid supply tube, a valve controlling the discharge of liquid from said tube, a stem extending rigidly therefrom, a float carried by said stem and a housing carried by said tube, said housing comprising a float chamber having openings therein and having a passage extending from said tube to said chamber and means for normally closing said passage.

5. In a faucet, a liquid supply tube, a valve controlling the discharge of liquid from said tube, a stem extending rigidly therefrom, a float carried by said stem and a housing carried by said tube, said housing comprising a float chamber having openings therein and having a passage extending from said tube to said chamber, said valve stem normally closing said passage.

6. In a faucet, a liquid supply tube, a valve controlling the discharge of liquid from said tube, a stem extending rigidly therefrom, a float carried by said stem and a housing carried by said tube, said housing comprising a float chamber having openings therein and having a passage extending from said tube to said chamber, said valve stem normally closing said passage and having means for establishing communication between said chamber and said tube when said valve is in a position between its open and closed positions.

7. In a faucet, a liquid supply tube, a valve controlling the discharge of liquid from said tube, a stem extending rigidly therefrom, a float carried by said stem and a housing carried by said tube, said housing comprising a float chamber having openings therein and having a passage extending from said tube to said chamber, said valve stem normally closing said passage, and having cut away portions for establishing communication between said chamber and said tube in the abnormal position of the stem.

8. In a faucet, a liquid supply tube, a valve controlling the discharge of liquid from said tube, a float for operating said valve, a float chamber having openings therein carried by said tube and means for directing fluid from said tube directly into said float chamber to flush the same when said valve is opened by the float.

In witness whereof, we hereunto subscribe our names this 19th day of December A. D., 1925.

CYRIL JOSEPH GORDON.
DAVID D. GOLDBERG.